United States Patent
Harrison et al.

(10) Patent No.: US 7,035,920 B2
(45) Date of Patent: Apr. 25, 2006

(54) REMOTE EXECUTION OF SOFTWARE USING WINDOWS MANAGEMENT INSTRUMENTATION

(75) Inventors: Brian Harrison, Scotts Valley, CA (US); Kyu-Woong Lee, Milpitas, CA (US); Christina M. Rogers, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 790 days.

(21) Appl. No.: 10/021,404

(22) Filed: Oct. 30, 2001

(65) Prior Publication Data
US 2003/0208573 A1    Nov. 6, 2003

(51) Int. Cl.
*G06F 15/173* (2006.01)
(52) U.S. Cl. .................... 709/223; 709/217; 709/220; 709/222
(58) Field of Classification Search ............ 709/223, 709/220
See application file for complete search history.

(56) References Cited

U.S. PATENT DOCUMENTS

| 6,389,589 B1 * | 5/2002 | Mishra et al. ............... 717/170 |
| 6,418,554 B1 * | 7/2002 | Delo et al. .................. 717/174 |
| 6,836,794 B1 * | 12/2004 | Lucovsky et al. .......... 709/223 |
| 2002/0138786 A1 * | 9/2002 | Chefalas et al. ............. 714/37 |

OTHER PUBLICATIONS

Policht, Marcin. "Installing Windows Installer Applications using WMI." Aug. 29th, 2001, Serverwatch Tutorials. http://www.serverwatch.com/tutorials/article.php/1476661.*

* cited by examiner

*Primary Examiner*—Rupal Dharia
*Assistant Examiner*—Nicholas Taylor

(57) ABSTRACT

A method for remote execution of software. A device manager instantiates a WMI CreateProcess object on a managed device which will call an executable residing on the device manager. The process is started, calling an executable on the device manager. The executable on the device manager is called and launched on the managed device. The executable starts and finishes on the managed device.

22 Claims, 6 Drawing Sheets

REMOTE EXECUTION OF SOFTWARE USING WINDOWS MANAGEMENT INSTRUMENTATION

FIELD OF THE INVENTION

The present invention relates to an apparatus and method for the remote execution of software using a Windows Management Instrumentation.

BACKGROUND OF THE INVENTION

Computers are coupled together in a network to provide digital communications. Computer networks are critical for carrying digital data used for Internet, IP telephony, video teleconferencing, e-commerce, file transfers, e-mail, databases, etc. And as these networks become bigger, more powerful, and more versatile, the networked computers can be programmed to perform more complex tasks. Accordingly, software applications are likewise becoming quite sophisticated. One problem arises when software has to be distributed across the network. For instance, new software is routinely being installed to give users new functionalities; software upgrades are installed for improved efficiency; and network software is installed to help monitor and administer the performance of the network.

In the past, a network administrator would have to physically visit each of the individual computers and manually install the software onto that particular station. This is a time consuming task. Furthermore, it is inefficient because of the associated downtime as software is being installed. In addition, there is much overhead expended in administering, tracking, and maintaining an accurate and updated log of the software state for each of the computers across the entire network. There can also be problems encountered with respect to software compatibility, troubleshooting, and licensing issues.

One prior art method to overcoming some of these problems involves executing software remotely over the network. FIG. 1 shows a prior art method for the remote execution of software. A device manager 101 resides on a server operated by the network administrator. It communicates and issues calls to a managed device 102 over the network. Initially, the device manager 101 creates a service on the managed device 102, step 103. The service is created on the managed device, which also registers itself, step 107. This is accomplished through a remote call. Next, the device manager 101 starts the service in step 104. A remote call is made to start the service on the managed device 102. The service calls the executable on the device manager's file system, step 108. In response, the executable called on the device manager 101 launches on the managed device 102 in step 105. The executable starts, runs, and then finishes on the managed device 102 in step 109. Lastly, in step 106, the device manager 101 stops the service and deletes it on the managed device 102. This causes the managed device 102 to stop, unregister, and delete the service in step 110.

Although this prior art solution solves the need to manually load software, it nevertheless suffers some serious drawbacks. Namely, this prior art method accomplished remote software management by a multi-step, complex creation of services, which executed an install executable on the management server. As such, this previous approach required extensive error checking and redundant network calls due to its complexity and number of required successful network connection calls. Furthermore, existing "CreateProcess" APIs are limited to the local systems, and cannot be executed on remote target systems over a network. Moreover, the prior art tended to be restricted to special cases or had to be customized to meet certain specific installation needs.

Therefore, there exists a need in the prior art for an improved, universal remote execution of software process. The present invention provides a unique, novel solution to these and other problems.

SUMMARY OF THE INVENTION

The present invention pertains to an apparatus and method for remote execution of software over a client-server network. Initially, both the server and client computers have Windows Management Instrumentation (WMI) loaded as part of their operating system. The device manager of the server first instantiates a WMI CreateProcess object on the client computer. This will call an executable residing on the device manager. Within the client, the process is started, resulting in a call to an executable on the device manager. Back on the server computer, the executable on the device manager is called and launched on the managed device. Lastly, the executable starts and finishes on the client computer. Thereby, the present invention enables a network administrator to remotely execute code on a host of client computers from a central server over a network connection.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

An apparatus and method for the remote execution of software using a web based enterprise management standard is described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

Figure 1:
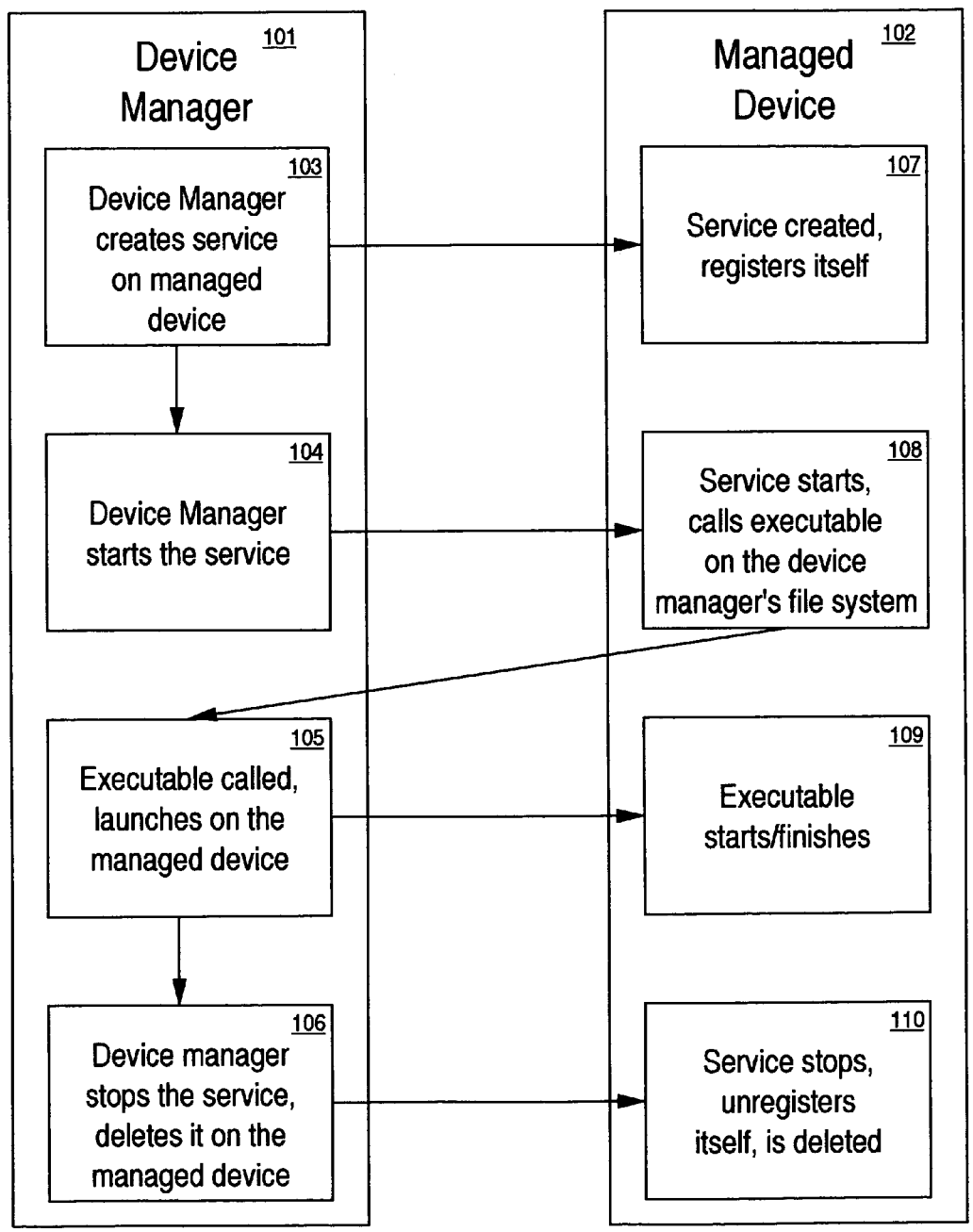
FIG. 1 shows a prior art method for the remote execution of software.
Figure 2:
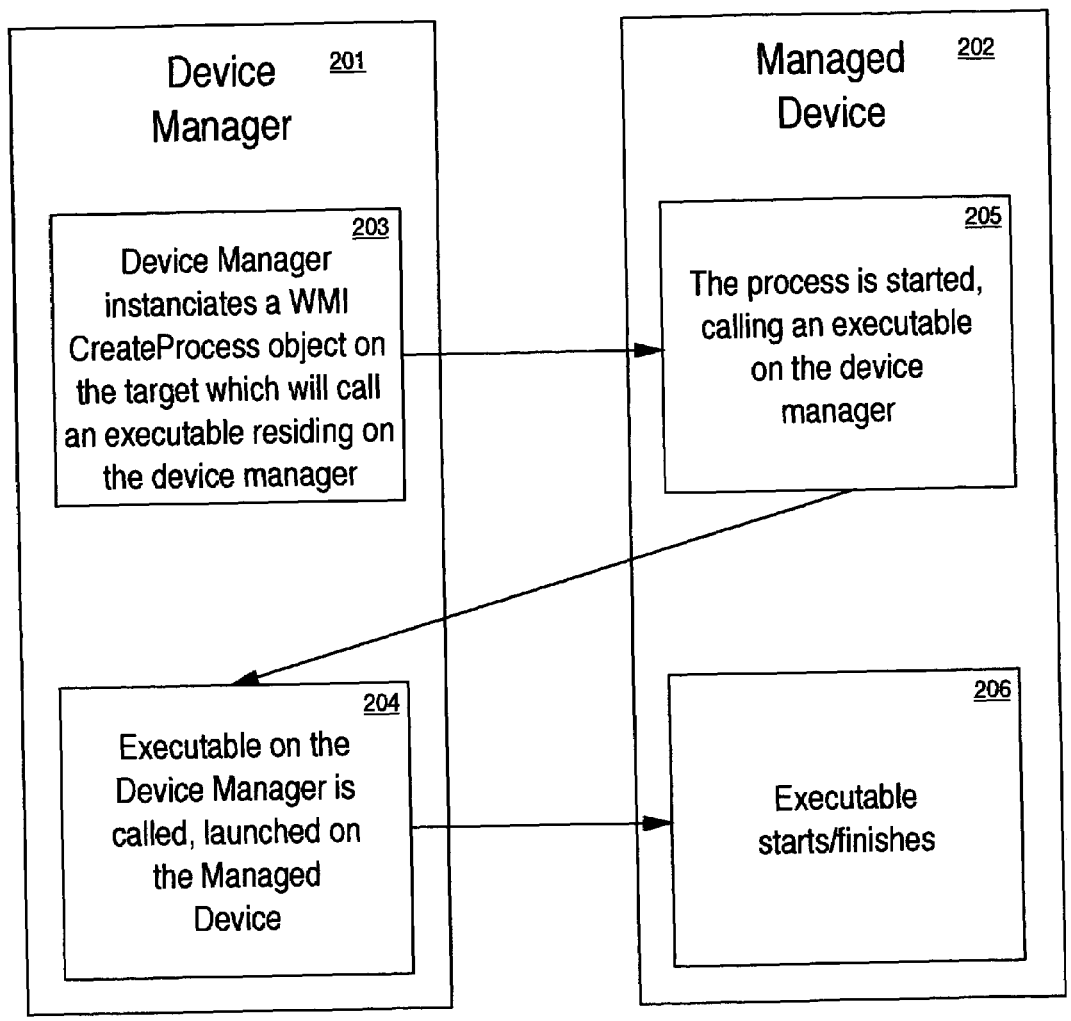
FIG. 2 shows a method for the remote execution of software using Windows Management Instrumentation (WMI) according to the currently preferred embodiment of the present invention.

FIG. 2 shows a method for the remote execution of software using Windows Management Instrumentation (WMI) according to the currently preferred embodiment of the present invention. Basically, WMI is an infrastructure to support the CIM model and Microsoft-specific extensions of the Common Information Model (CIM). CIM is an objectoriented model that represents and organizes the information in a "managed environment." CIM objects include computer systems, devices (like printers and batteries), controllers (for example, PCI and USB controllers), files, software, physical elements (like chassis and connectors), people, organizations, networks, protocol endpoints, policy, and more. CIM also is evolving its eventing object hierarchy and mechanisms. Going beyond just describing raw data, CIM provides additional capabilities. It allows the definition of associations and methods. Associations describe relationships between objects—dependencies, component relationships (when an object is a component or part of a whole), connections (topologies), and more. Input/output parameter lists and return codes can be defined for methods. CIM defines a series of objects with respect to a basic set of classes and associations. The WMI infrastructure ships in Microsoft Windows NT® 4.0 SP4 and Windows 2000. It runs as the "Windows Management" Service. The architecture of the Windows Management Instrumentation technology consists of: a management infrastructure, management applications, and providers of data from "managed objects."

A device manager 201 runs on a server coupled to a network (LAN, MAN, WAN, or a virtual network). The device manager 201 comprises a collection of routines which acts as an interface for various drivers. The device manager 201 instantiates a WMI CreateProcess object on the target, step 203. The CreateProcess object calls an executable residing on the device manager 201. In other words, a Process object is created and then a Create method is executed. A managed device 202 resides on a computer coupled to the network. The process is started on the managed device in step 205, which calls an executable on the device manager 201. In turn, the executable on the device manager 201 is called in step 204. It is then launched on the managed device 202. Lastly, in step 206, the executable starts and finishes on the managed device 202.

Figure 3:
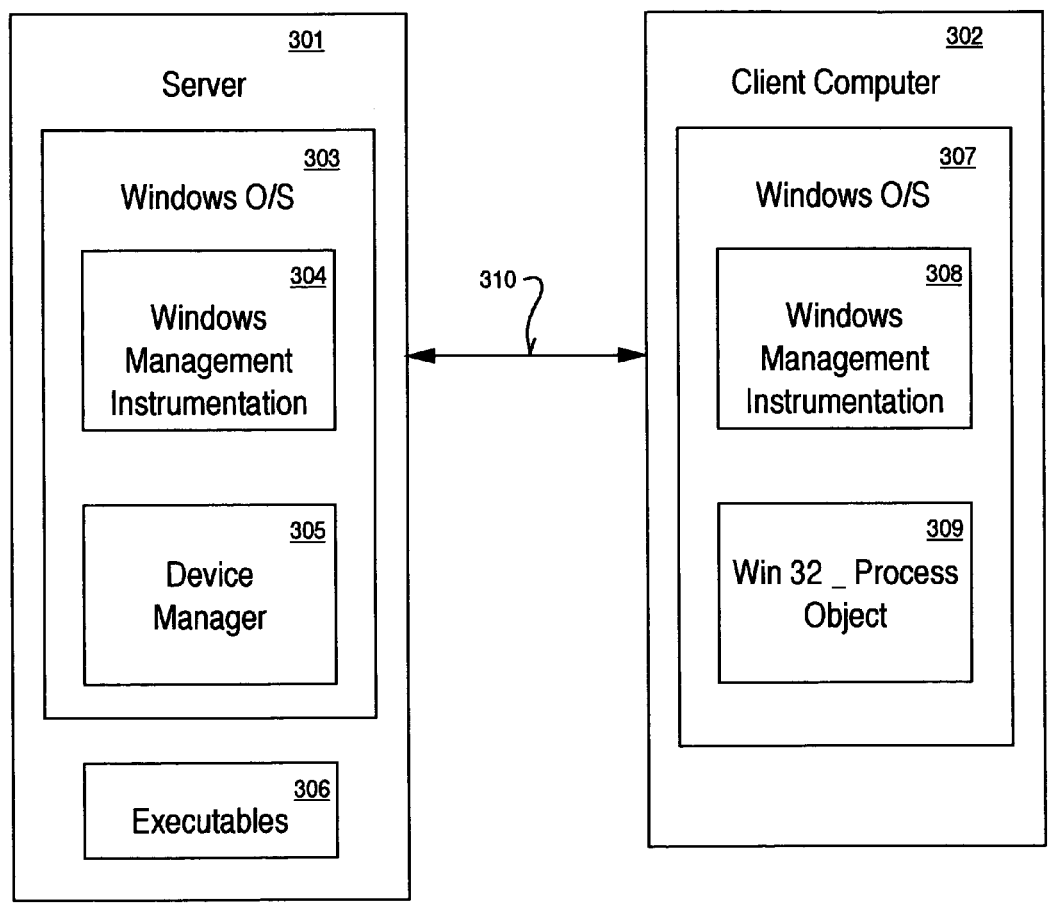
FIG. 3 shows the software running on a network upon which the present invention may be practiced.

FIG. 3 shows the software running on a network upon which the present invention may be practiced. A network administrator operating from a server 301 can select any of the client computers on that network to which they have access privilege for the remote execution of software. For instance, client computer 302 can be selected by the network administrator over a local area network (LAN) connection 310. Server 301 has a Windows compatible operating system 303. Included within the Windows O/S is a Windows Management Instrumentation software package 304 and a device manager 305. Any number of different executable code 306 can be stored within the memory of server 301. Client computer 302 (e.g., laptop, desktop, server, workstation, terminal, portable computing device, etc.) operates off a Windows O/S 307. Included within the Windows O/S 307 is the Windows Management Instrumentation software package 308 and a Win32_Process Object 309.

Figure 4:
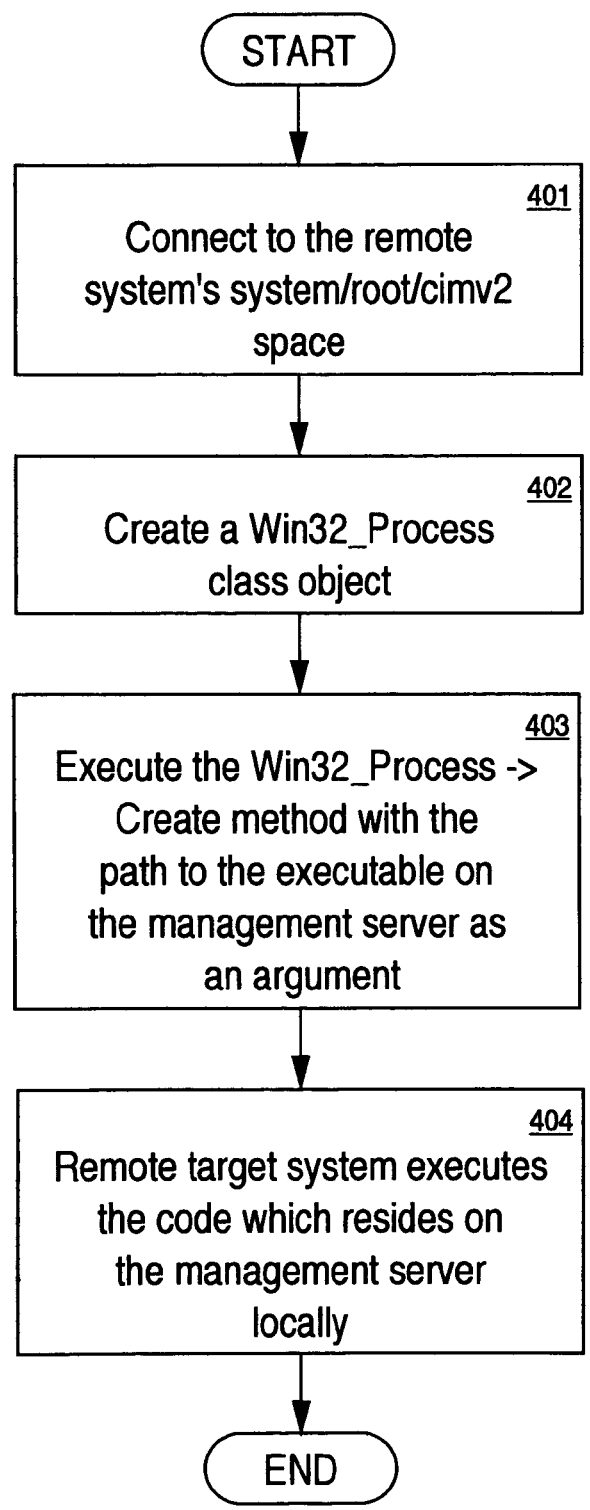
FIG. 4 shows a specific device manager driven process for a remote execution of a software package.

The executable code 306 is installed on the management device, server 301. The target system, client 302, already has WMI 308 installed. When a remote install of the package is required, the device manager 305 takes the following steps as shown in FIG. 4. First, it connects to the remote system's system\root\cimv2 space, step 401. Next, it creates a Win32_Process class object, step 402. It then executes the Win32_Process→Create method with the path to the executable on the management server as an argument, step 403. The remote target system then executes the code which resides on the management server, locally on itself, step 404.

Thereby the present invention confers several advantages over that of the prior art. The present invention greatly simplifies the process of remote execution of software by eliminating the need for the creation of a remote service. Furthermore, the present invention minimizes the number of network calls, which reduces network congestion and therefore reduces the redundancy code necessary for service type remote uninstall. As such, the present invention increases the robustness of remote execution of software packages. It also eliminates any need for unpacking of software on the target device. It should be noted that the present invention requires installation of WMI only, which comes with on all Windows 2000 and Windows XP operating systems. The present invention can be used to execute any desired code which resides anywhere on the network, but typically is found on a management server of some kind.

Some typical examples of an application would be remote deploy and uninstall of software. The install/uninstall code would reside on a management server. The management server would then carry out the process to have the target system execute the code which resides on the server. Note that the executables have to be placed in directories with the correct share/access permissions. A typical configuration may be the one used for the software packages' directories. Also, the Distributed Communication Object Model (DCOM) registration of the management code must be addressed (e.g., by using the Global Settings Manager). Execution of the code would result in installation or uninstallation of software packages. For example, the present invention could be used to monitor the states of various network elements.

Figure 5:
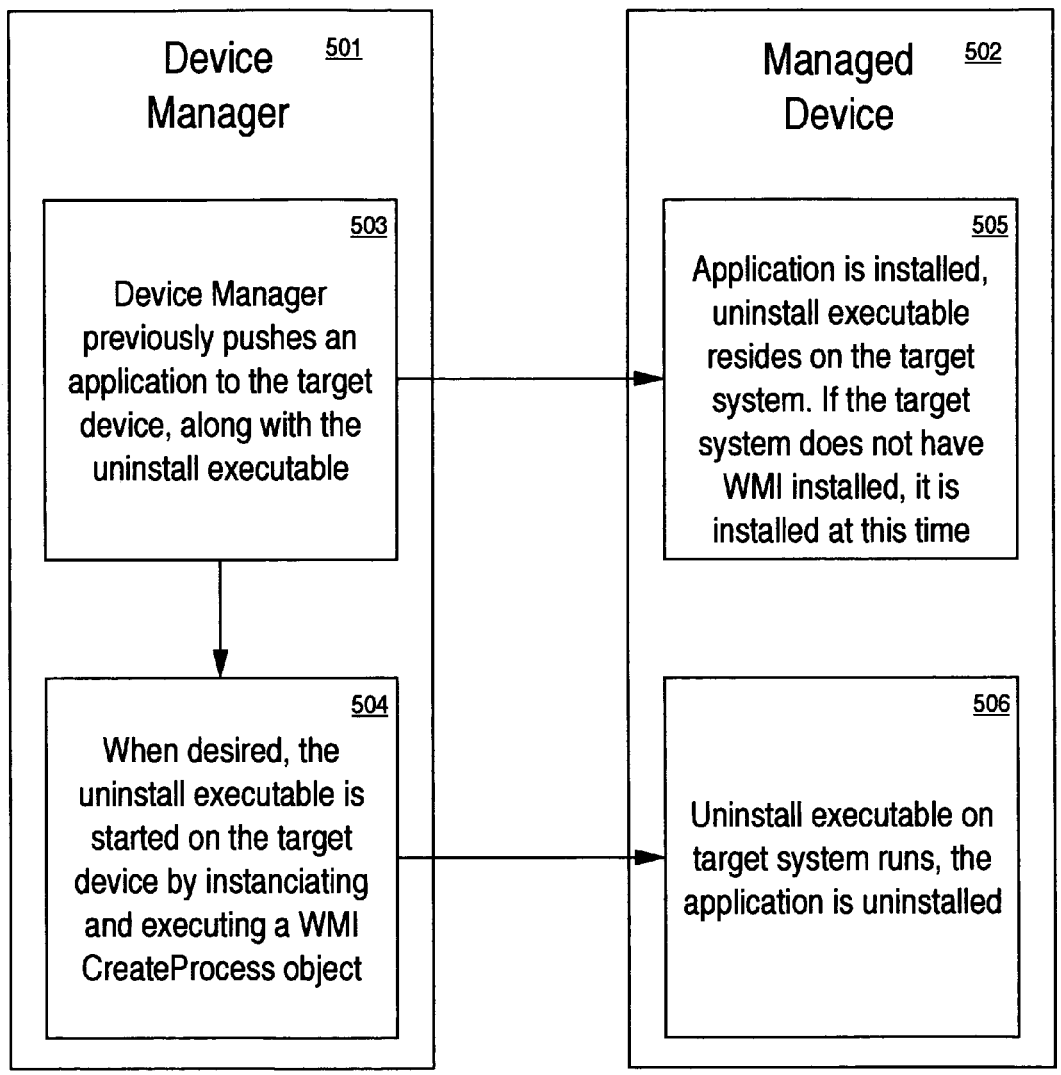
FIG. 5 shows the process by which the present invention is used to remotely uninstall software.

In one embodiment, the present invention is used for the remote uninstallation of software using WMI. FIG. 5 shows the process by which the present invention is used to remotely uninstall software. A device manager 501 running on a server is used to communicate with the managed device 502. The device manager 503 previously pushes an application to the target device, along with the uninstall executable, step 503. This causes the managed device 502 to initially install the application, whereby the uninstall executable also resides on the target system, step 505. If the target system does not already have WMI installed, it is installed at this time. Next, when desired, the uninstall executable is started on the target device by creating a Process object and then executing a Create method in step 504. As a result, in step 506, the uninstall executable on the target system runs. And the application is thereby uninstalled.

Figure 6:
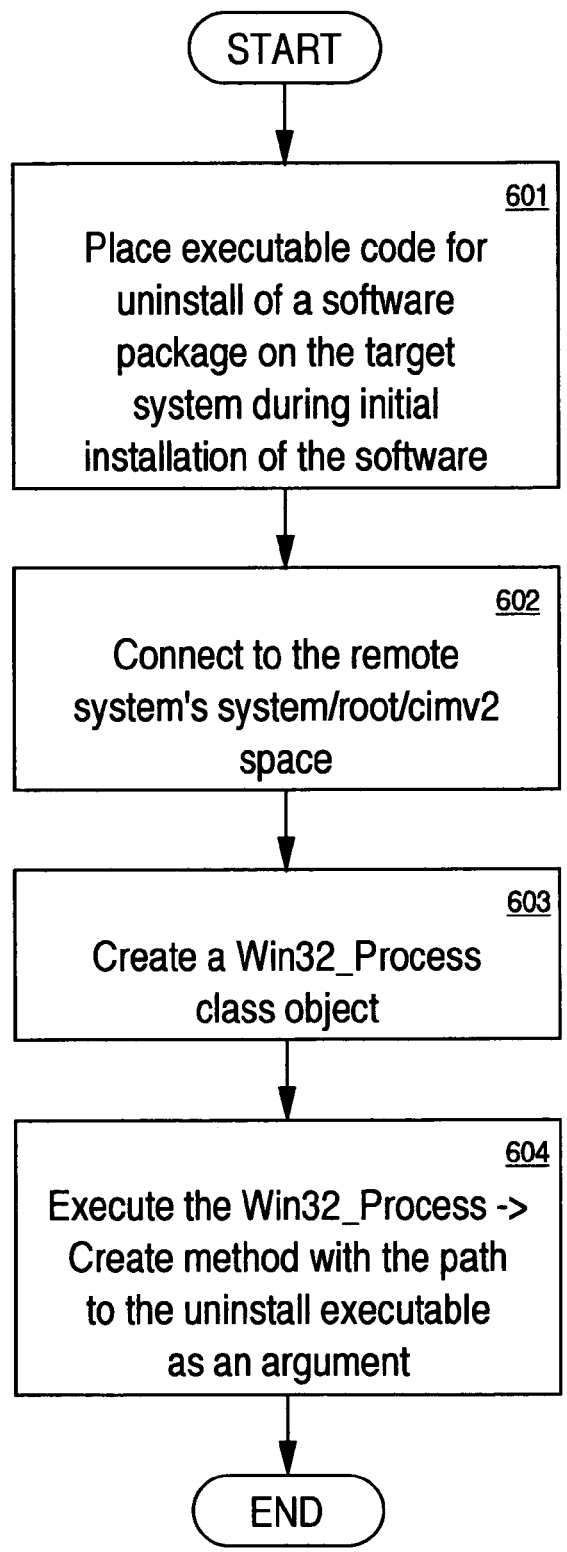
FIG. 6 is a flowchart describing the steps for the remote uninstallation of software according to one embodiment of the present invention.

FIG. 6 is a flowchart describing the steps for the remote uninstallation of software according to one embodiment of the present invention. Initially, the executable code for the uninstall of a software package is placed on the target system, step 601. This is typically done during initial installation of the software. It is assumed that the target system already has Microsoft WMI installed, or it has Microsoft WMI installed when the software package is installed. When a remote uninstall of the package is required, the device manager performs steps 602–604. In step 602, the device manager connects to the remote system's system\root\cimv2 space. A Win32_Process class object is created, step 603. The device manager then executes the Win32_Process→Create method with the path to the uninstall executable as an argument, step 604. In other words, the create method is being executed on the Win32_Process. The location of the uninstall executable on the target system can be stored in a known place, such as the target system's registry or a file, upon initial installation.

The present invention for the remote uninstallation of software offers several advantages. The prior art accomplished remote software management by a multi-step, complex creation of services, which executed an uninstall executable on the management server. This previous approach required extensive error checking and redundant network calls due to its complexity and number of required successful network connection calls. In contrast, the present invention simplifies the process by eliminating the need for the creation of a remote service and thereby minimizing the number of network calls. Furthermore, the present invention increases the robustness of remote uninstall of software packages. It also reduces the complexity of remote uninstall by leveraging the initial installation. Additionally, the number of network calls is reduces, thereby reducing the redundancy code necessary for service type remote uninstall.

It should be noted that the foregoing descriptions of specific embodiments of the present invention have been presented for purposes of illustration and description. They are not intended to be exhaustive or to limit the invention to the precise forms disclosed, and obviously many modifications and variations are possible in light of the above teaching. For example, the present invention is not limited to WMI. It is equally applicable to any software routines having equivalent functionalities. One such standard upon which the present invention may be practiced includes the Web Based Enterprise Management (WBEM) standard. WBEM is a set of management and Internet standard technologies developed to unify the management of enterprise computing environments. WBEM provides the ability for the industry to deliver a well-integrated set of standard-based management tools leveraging the emerging Web technologies. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for remote execution of software, comprising:
   installing executable code on a management device;
   communicatively coupling said management device to a remote system;
   at said remote system, creating by said management device a class object, wherein said class object is compatible with a Win32_Process class object;
   at said remote system, executing by said management device a create method with a path to said executable code on said management device as an argument; and
   executing at said remote system said executable code residing on said management device.

2. The method of claim 1 further comprising instantiating an object on said remote system which calls said executable code residing on said management device.

3. The method of claim 2, wherein a device manager of said management device instantiates said object using Windows Management Instrumentation software.

4. The method of claim 2 further comprising launching said executable code on said management device.

5. The method of claim 4 further comprising starting and finishing said executable code by said remote system.

6. The method of claim 1 further comprising:
   installing an application on said remote system; and
   running an uninstall executable code on said remote system as directed by a device manager of said management device.

7. The method of claim 6, wherein said uninstall executable code is started on said remote system by instantiating and executing a Windows Management Instrumentation object.

8. The method of claim 7, wherein said object comprises a Create Process object.

9. The method of claim 6 further comprising:
   communicatively coupling to a system/root/cimv2 space of said remote system;
   at said remote system, creating a Win32_Process class object; and
   at said remote system, executing a Win32_Process→Create method with a path to said uninstall executable code on said management device as an argument.

10. The method of claim 1 further comprising the step of implementing a Web Based Enterprise Management (WBEM) standard to facilitate said remote execution of software.

11. A method of remote execution of software between a server and a client using Windows Management Instrumentation (WMI) software, comprising:
    installing executable code on said server;
    installing said WMI software on said client;
    a device manager of said server performing:
      a) accessing a system\root\cimv2 space of said client;
      b) at said client, creating a Win32_Process class object;
      c) at said client, executing a Win32_Process→Create method with a path to said executable code on said server as an argument; and
    executing at said client said executable code residing on said server.

12. A client-server system, comprising:
    a server having a device manager that instantiates a Windows Management Instrumentation (WMI) Create Process object at a client and creates a Win32 Process class object at said client, wherein said Win32 Process class object is used by said client to call an executable residing on said server; and
    said client coupled to said server having said executable, wherein once said Win32 Process class object calls said executable, said executable is launched on said client and said executable starts and finishes remotely on said client.

13. The client-server system of claim 12, wherein said device manager accesses a system\root\cimv2 space of said client.

14. The client-server system of claim 13, wherein said device manager executes a Win32_Process→Create method with a path to said executable code on said server as an argument.

15. A method for remote uninstallation of software, comprising:
    installing an application on a remote system over a network connection; and
    running an uninstall executable code on said remote system as directed by a device manager running on a management device, wherein said running said uninstall executable code comprises:
    accessing a system\root\cimv2 space of said remote system, and at said remote system, creating a Win32_Process class object.

16. The method of claim 15 further comprising starting said uninstall executable code on said remote system by executing a Win32_Process→Create method with a path to said uninstall executable code for uninstall on said management device as an argument.

17. The method of claim 15, wherein said Win32_Process class object is a Windows Management Instrumentation class object.

18. A method for remote uninstallation of software between a server and a client using Windows Management Instrumentation (WMI) software, comprising:
   loading executable code for uninstall of an application during initial
   installation of said application on said client
   installing said WMI software on said client;
   a device manager of said server performing:
      a) accessing a system\root\cimv2 space of said client;
      b) at said client, creating a Win32_Process class object;
      c) at said client, executing a Win32_Process→Create method with a path to said executable code for uninstall on said server as an argument, wherein said application is remotely uninstalled.

19. A client-server system, comprising:
   a server having a device manager which installs applications and uninstall executable code on client computers over a network connection; and
   a client computer coupled to said server which runs said uninstall executable code as directed by said device manager, wherein said device manager accesses a system\root\cimv2 space of said client computer and creates a Win32_Process class object at said client computer.

20. The client-server system of claim 19, wherein said device manager starts said uninstall executable code on said client computer by instantiating and executing a Windows Management Instrumentation object.

21. The client-server system of claim 19, wherein said device manager executes a Win32_Process→Create method with a path to said executable code for uninstall on said server as an argument, wherein said application is remotely uninstalled.

22. The client-server system of claim 19, wherein a Web Based Enterprise Management (WBEM) standard is used to facilitate remote uninstall of software.

* * * * *